Patented Jan. 9, 1945

2,366,981

UNITED STATES PATENT OFFICE 2,366,981

FREQUENCY CONVERTER

Leslie Harold Paddle, St. Paul's Cray, and Bernard Drake, Bromley, England

Application June 16, 1942, Serial No. 447,260
In Great Britain July 16, 1941

11 Claims. (Cl. 172—281)

This invention relates to frequency converters of the kind wherein an electric current supply of one frequency is employed as an input to obtain from the converter an output current of another frequency, which is, at least substantially, a sub-harmonic of the said input frequency, without the use of dynamic parts (in the process of conversion).

In general, such static frequency converters are somewhat unstable and for various reasons, for example due to heavy loading of the output circuit, the converter may fail to maintain the desired sub-harmonic oscillations. It then becomes necessary again to effect a starting operation. Such starting or restarting can be effected by subjecting the sub-harmonic oscillatory circuit to an electrical shock or surge, the transient nature of which serves to initiate oscillations in the sub-harmonic circuit, which oscillations, if the operating conditions are suitable, will be maintained by the input current of higher frequency, until such time as the circuit operating conditions become unfavourable.

According to the present invention the starting or maintenance of the sub-harmonic oscillatory circuit in operation is effected as a result of the introduction into it of at least one reactive element—for example a condenser or inductance or condenser and inductance combination—which has been charged and which discharges when introduced into the circuit and subjects the circuit to the desired electrical shock or surge.

The switching means, the operation of which serves to bring about the charging of the chargeable reactive element or elements and the introduction of the charged element or elements into the oscillatory circuit, may be adapted for manual or automatic operation. If manual operation is adopted such switching means may be intercoupled or interlocked either mechanically or otherwise with the main switch whereby the energising current for the converter is controlled.

An important advantage of the present invention resides in the fact that it is possible to arrange the starting means of the converter in such a way that the operation of such starting means does not introduce disadvantages consequent upon sparking. This is achieved by reason of the fact that in operation of the switching means for changing over the charged reactive element or elements a break of circuit will first occur followed by a make. Thus in cases where the main power supply in the converter is employed as the charging source, reactive elements which form a tank circuit tuned substantially to the power supply frequency are isolated by the switching means and when so isolated are charged. Now it will be appreciated that, as the switching means operates and the contacts connecting the now oscillating tank circuit to the power supply circuit open, there will be no arcing, since the voltage across the parting contacts will remain substantially zero; this result is obtained in view of the fact that the tank circuit behaves with respect to the power supply as though it were a resistance of high value, since it is in resonance as a rejector circuit at this frequency and it is well known that breaking a circuit of high resistance in which no reactance is present does not in general produce sparking.

In the accompanying drawing we have shown, by way of example only, diagrams of circuits of converters according to our invention but it will, of course, be understood that a large variety of circuit arrangements are possible in carrying out the invention.

In the drawing

Figure 1:
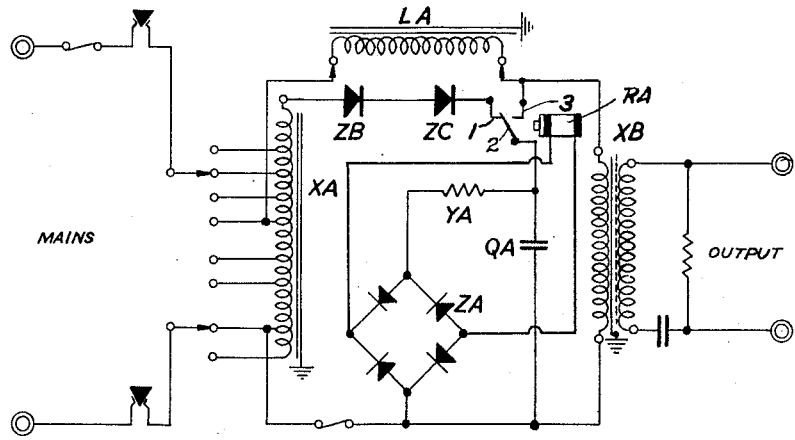
Figure 1 illustrates a preferred circuit in which the chargeable reactive element is constituted by a condenser.

Referring particularly to Figure 1, current of the higher supply frequency flows through a desired primary portion of the tapped autotransformer XA that has a secondary tap connected through the non-linear reactance element, i. e. the saturable choke coil LA, to the primary winding of the output transformer XB that delivers to a load, not shown, a current of a frequency that is a sub-harmonic of the supply current frequency. The converter circuit, when operative, also includes the condenser QA that is shunted across the primary of the output transformer and tunes the circuit for oscillation at the sub-harmonic frequency. Automatic starting of the frequency converter upon closing the supply circuit to the auto-transformer XA is provided by a relay RA having a change-over switch or movable contact arm 2 is employed. This change-over switch 2 is connected to the condenser QA and the contact 1, against which it rests when the circuit is inoperative, is connected to a source of direct current which, in the arrangement shown, is derived from the high voltage terminal of the alternating current power supply transformer XA by rectification by means of the dry plate rectifiers ZB and ZC. The coil of the relay RA is connected in shunt across the condenser by way of the voltage dropping resistance YA, so that when the supply is first switched on, the condenser charges up and the relay operates. The change-over switch 2 now swings over and touches the contact 3, which is connected to the junction point of the saturable choke LA and the primary of the output transformer XB. The converter circuit is thus completed and the discharge of the condenser consequently initiates oscillations. If the phase is not in opposition to that of the mains, so that oscillation is maintained, the relay is held in the operated condition by the low frequency current through the condenser QA which is rectified by the bridge network ZA before being applied to the relay coil. The relay may be slugged in known manner so that sufficient time is allowed for the condenser to charge fully before operation occurs. The slugging also allows the oscillations of the tank circuit formed by condenser QA and the primary of transformer XB to die away before the contacts part on the return stroke of the relay on switching off the main supply, or at starting if oscillation is not maintained at the first stroke of the relay due to phase opposition with the mains. In the latter case the relay armature falls off, allows the condenser to pick up a new charge and then operates a second time, or if necessary repeats the process until the correct phase relationship for maintaining oscillations is struck.

It will be observed that in the normal position the change-over switch connects the condenser to the charging circuit and when the relay is operated, following the charging of the condenser, the change-over switch operates to disconnect the condenser from the charging circuit and introduce the charged condenser into the sub-harmonic oscillatory circuit. During the change-over the relay winding is maintained energised by discharge from the condenser. It will be obvious that if sub-harmonic oscillations are present the relay winding will be energised as a result thereof and maintain the converter in the operative condition until such time as the sub-harmonic oscillations fail, whereupon the relay winding will be de-energised and the change-over switch will resume its normal position so that a re-starting cycle can be initiated.

Figure 2:
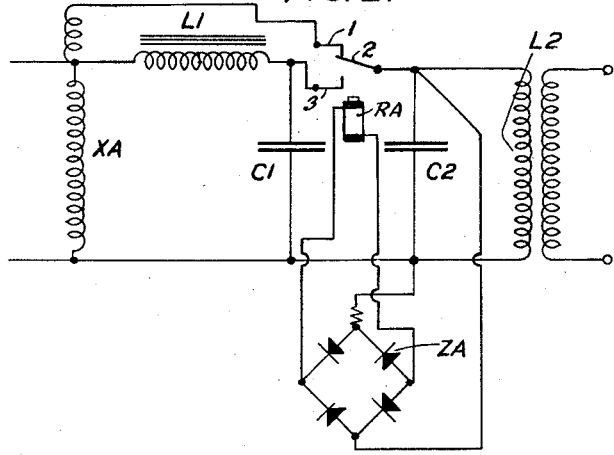
Figure 2 illustrates an alternative circuit in which the chargeable reactive elements comprise a condenser and an inductance constituting a tank circuit.

In Figure 2 L1 indicates a saturable choke connected to the step-up auto-transformer XA, C2 and L2 are a condenser and inductance respectively which together constitute a rejector circuit tuned substantially to the input supply frequency. C1 is a condenser normally connected in series with the choke L1 which condenser is so proportioned that when connected in parallel with condenser C2 it, together with inductances L1 and L2, forms a circuit adapted to oscillate at the desired sub-harmonic frequency.

The arrangement may be controlled manually by means of the change-over switch 2 but this change-over switch is preferably automatically operated by means of a relay RA connected across condenser C2 in a manner similar to that shown in Figure 1 with relation to condenser QA. The contact 1 is in this arrangement connected to the auto-transformer XA so as to impress upon the circuit L2—C2 a voltage higher than that of the supply circuit for the purpose of causing this circuit to resonate at a high voltage for the purpose of providing a powerful starting impulse.

Figure 3:
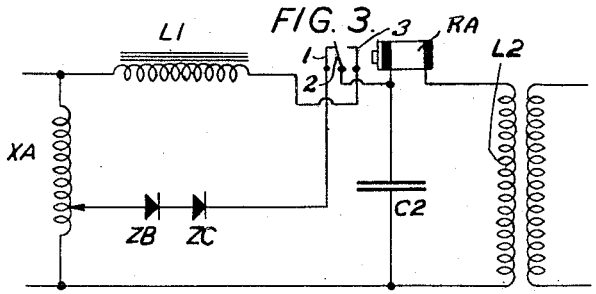
Figure 3 illustrates a case in which practically all the starting energy is stored magnetically in a charged inductance constituting the chargeable reactive element.

Referring to Figure 3 L1 again designates the saturable choke. The effective chargeable reactive element is formed by the inductance L2 which forms part of the output transformer. In this arrangement direct current is derived from a step-down auto-transformer XA after rectification by means of the dry plate rectifiers ZB and ZC and is passed through the inductance L2, which forms part of the oscillatory circuit L1, L2, C2 adapted to oscillate at the sub-harmonic frequency. When the current through inductance L2 reaches a predetermined value producing sufficient saturation or charge relay RA, which in this case is connected in series with inductance L2, operates the change-over switch 2. This change-over switch 2 is first removed from contact with contact 1 thus breaking the circuit of inductance L2 which, being bridged by condenser C2, discharges into this capacity thus preventing or minimising the spark at break, and then the change-over switch 2 comes into contact with contact 3 thus completing the converter circuit so that the sub-harmonic oscillations set up by the impulsive discharge of inductance L2 are maintained.

What we claim and desire to secure by Letters Patent is:

1. A frequency converter comprising an input impedance having means for connecting the same to a source of alternating current, a converter circuit connected across said input impedance and resonant at a frequency which is substantially a sub-harmonic of the source frequency, said converter circuit including reactance elements in series with a non-linear impedance during normal operation of the converter, and starting means for initiating oscillations of sub-harmonic frequency in said converter circuit; said starting means comprising a source of charging current, and switch means for switching at least one of said reactance elements from normal circuit connection in series with said non-linear impedance to connection with said source of charging current and back to said normal connection, whereby the charged reactance element is discharged into said converter circuit.

2. A frequency converter as recited in claim 1, wherein said starting means includes a relay responsive to the charge condition of said charged reactance element to actuate said switch means.

3. A frequency converter as recited in claim 1, wherein said input impedance constitutes said source of charging current.

4. A frequency converter comprising an oscillatory input circuit resonant at one frequency, an oscillatory output circuit linked thereto and tuned to a frequency which is substantially a sub-harmonic of the input circuit frequency, said output circuit including a condenser and an inductance in series with a non-linear reactance, and a starting circuit; said starting circuit including a source of charging current, said condenser of the output circuit, and switch means to connect said condenser in said starting circuit to charge the condenser or alternatively to connect said condenser in said output circuit to initiate or maintain the sub-harmonic oscillations therein.

5. A frequency converter as recited in claim 4, wherein said input circuit constitutes said source of charging current.

6. A frequency converter as recited in claim 4, wherein said input circuit constitutes said source of charging current, and said starting circuit includes rectifier means for charging said condenser with direct current.

7. A frequency converter comprising an oscillatory input circuit resonant at one frequency, a tuned circuit comprising a condenser and inductance resonant at substantially the input circuit frequency, a non-linear reactance, and switch means for connecting said tuned circuit to said oscillatory input circuit through said non-linear reactance or alternatively through a charging circuit connection excluding said non-linear reactance, said tuned circuit and non-linear reactance resonating at a frequency which is substantially a sub-harmonic of said input circuit frequency.

8. A frequency converter as recited in claim 7, wherein said switch means includes a relay connected to said tuned circuit and operable in accordance with the charge condition thereof to connect said tuned circuit and input circuit through said non-linear reactance when said tuned circuit is charged.

9. A frequency converter as recited in claim 7, wherein said switch means includes a relay connected across said tuned circuit and operable automatically when said tuned circuit is not charged to connect said tuned circuit to the input circuit through said charging circuit connection.

10. A frequency converter as recited in claim 7, wherein said switch means includes a relay in series in said tuned circuit and operable automatically when said tuned circuit is not charged to connect said tuned circuit to the input circuit through said charging circuit connection.

11. A frequency converter as recited in claim 7, wherein said charging circuit connection includes means for impressing upon said tuned circuit a higher charging voltage than that impressed upon said tuned circuit through said non-linear reactance.

LESLIE HAROLD PADDLE.
BERNARD DRAKE.